US008327265B1

(12) United States Patent
Vogel

(10) Patent No.: US 8,327,265 B1
(45) Date of Patent: *Dec. 4, 2012

(54) SYSTEM AND METHOD FOR PARSING A DOCUMENT

(75) Inventor: Claude Vogel, Alfortville (FR)

(73) Assignee: Lucimedia Networks, Inc., Reston, VA (US)

(*) Notice: Subject to any disclaimer, the term of this patent is extended or adjusted under 35 U.S.C. 154(b) by 3673 days.

This patent is subject to a terminal disclaimer.

(21) Appl. No.: 09/687,612

(22) Filed: Oct. 11, 2000

Related U.S. Application Data

(63) Continuation-in-part of application No. 09/288,994, filed on Apr. 9, 1999, now Pat. No. 6,424,982.

(51) Int. Cl.
*G06F 17/00* (2006.01)

(52) U.S. Cl. ............ 715/256; 715/254; 715/255; 704/4; 704/9

(58) Field of Classification Search .................. 715/513, 715/501.1, 254, 255, 256; 707/3, 4; 704/4, 704/9
See application file for complete search history.

(56) References Cited

U.S. PATENT DOCUMENTS

| 5,371,807 | A | | 12/1994 | Register et al. |
| 5,745,602 | A | | 4/1998 | Chen et al. |
| 5,819,260 | A | * | 10/1998 | Lu et al. ............................ 707/3 |
| 6,014,680 | A | | 1/2000 | Sato et al. |
| 6,070,158 | A | | 5/2000 | Kirsch et al. |
| 6,424,982 | B1 | * | 7/2002 | Vogel ............................ 715/531 |
| 6,519,586 | B2 | * | 2/2003 | Anick et al. ..................... 707/3 |
| 6,571,240 | B1 | * | 5/2003 | Ho et al. .......................... 707/5 |

FOREIGN PATENT DOCUMENTS

| EP | 0 741 464 A2 | 4/1996 |
| JP | 08-305730 | 11/1996 |
| WO | WO 98/38560 | 9/1998 |

OTHER PUBLICATIONS

Japanese Office Action, with English Translation, issued in Japanese Patent Application No. JP 2008-3157 dated on Aug. 18, 2008.
Uchiyama et al "Development of an Automatic Keyword-Extracting System of the Basis of Content Analysis and an Application System" Computer Communications Research Center, pp. 151-161 Jul. 18, 1991, Tokyo Electric Power Company.
Witten, I.H. et al., "KEA: Practical Automatic Keyphrase Extraction," ARXIV.ORG, [online], Feb. 5, 1999, XP002511489, Cornell University Library, Ithaca, NY, USA, Retrieved from Internet: <http://arxiv.org/abs/cs/9902007v1> retrieved on Jan. 22, 2009.

(Continued)

*Primary Examiner* — Stephen Hong
*Assistant Examiner* — Matthew Ludwig
(74) *Attorney, Agent, or Firm* — SNR Denton US LLP

(57) ABSTRACT

A parsing system and method are provided in which the break characters in the document are used to rapidly parse the document and extract one or more key phrases from the document which characterize the document. The break characters in the document may include explicit break characters, such as punctuation, soft stop words and hard stop words. The determination of which phrases in the document are extracted depends upon the type of break character appearing after the phrase in the document. The parser may also be used to parse a foreign language document into one or more phrases.

9 Claims, 18 Drawing Sheets

OTHER PUBLICATIONS

Turney, P., "Learning to Extract Keyphrases from Text," NRC-CNRC National Research Council of Canada, [online] vol. NRC/ERB-1057, Feb. 12, 1999, XP002511490, Retrieved from the Internet: <http://www.iit.iti.nrc-cnrc.gc.ca/iit-publications-iti/docs/NRC-41622.pdf>, retrieved on Jan. 21, 2009.

European Search Report issued in European Patent Application No. EP 00923179 dated Feb. 2, 2009.

* cited by examiner

```
*********************************                                    60
COMPUTER SELECT, OCTOBER 1995
COPYRIGHT NEWSBYTES INC. 1995
*********************************
NEWSBYTES
NEWSBYTES AUGUST 31, 1995 PNEW0831000

NEC DEVELOPS "SNAKE-LIKE" ROBOT.
AUTHOR
MARK, JEREMY
FULL TEXT
TOKYO, JAPAN, 1995 AUG 31 (NB) -- NEC CORPORATION HAS DEVELOPED A ROBOTICALLY
CONTROLLED ELECTRIC SNAKE THAT OFFERS FAR MORE MOVEMENT THAN PREVIOUSLY
DESIGNED ROBOTS. THE COMPANY SAYS THAT THE MUCH GREATER FREEDOM OF MOVE-
MENT "MAKES IT PERFECT" FOR EVERYTHING FROM INDUSTRIAL TO DISASTER RELIEF WORK.
THE SECRET OF THE NEW DEVICE LIES IN A REVOLUTIONARY NEW TYPE OF UNIVERSAL JOINT.
PREVIOUSLY JOINTS IN THE BODY OF ROBOT HAVE BEEN RESTRICTED TO MOVEMENT IN JUST
ONE PLANE, EITHER LEFT AND RIGHT OR UP AND DOWN. BUT THE TOKYO-BASED COMPANY
SAYS IT HAS SUCCEEDED IN DEVELOPING THE WORLD'S FIRST ACTIVE UNIVERSAL JOINT.
CONTROLLED BY TWO MOTORS, THE JOINT ALLOWS FULL FREEDOM OF MOVEMENT IN ALL
PLANES AT EACH OF THE SIX JOINTS ALONG THE ROBOT'S BODY, ALLOWING THE UNIT TO
CRAWL INTO PLACES PREVIOUSLY INACCESSIBLE.
AT THE HEART OF THE ROBOT IS A COMPUTER PROCESSING UNIT THAT RECEIVES SIGNALS
FROM THE OPERATOR'S HANDSET AND CONTROLS MOVEMENT. THE CONTROLLER CAN
INSTRUCT THE COMPUTER TO CONTROL ALL THE JOINTS IN HARMONY OR SPECIFY INDIVIDU-
AL CONTROL OF EACH JOINT IF NECESSARY.
A VIDEO CAMERA AT THE HEAD OF THE ROBOT SENDS SIGNALS BACK TO THE OPERATOR
WHO CAN USE THEM TO STEER THE UNIT AND ALSO TO EXAMINE PLACES INACCESSIBLE TO
HUMANS.
THE ENTIRE DEVICE IS 1.4 METERS LONG AND MEASURES 42 MILLIMETERS IN DIAMETER. IT
WEIGHS 4.6 KILOGRAMS.
THE AS-YET UNNAMED DEVICE IS NOT YET COMMERCIALLY AVAILABLE, NEC'S MARK PEARCE
TOLD NEWSBYTES. "IT WILL BE A COUPLE OF YEARS BEFORE EVERYTHING IS SORTED OUT
AND IT'S READY TO BE SOLD. WE HAVE TO INCREASE THE SPEED AMONGST OTHER THINGS,"
HE SAID.
NEC SAYS TYPICAL APPLICATION FOR SUCH A ROBOT COULD BE INVESTIGATION OF COMPLEX
PIPEWORK OR AS AN AID TO SEARCH TEAMS IN DISASTER HIT AREAS WHERE THE DEVICE
COULD CRAWL THROUGH THE RUBBLE OF COLLAPSED BUILDINGS.
(MARTYN WILLIAMS/19950830/PRESS CONTACT: MARK PEARCE, NEC CORPORATION, TEL
+81-3-3457-7249, INTERNET E-MAIL MAKU_10-
2215@ALADDIN.NEC.CO.JP/NEC950831/PHOTO)

RECORD #
17 337 353
```

FIGURE 4

| WORD READ | WORD TYPE | BUFFER | WORD INDEX | COMMENTS |
|---|---|---|---|---|
| ************ | BREAK | | | |
| ************ | | | | |
| COMPUTER | COMPUTER | COMPUTER | | |
| SELECT | SELECT | COMPUTER SELECT | | |
| | BREAK | FLUSH | COMPUTER SELECT | |
| OCTOBER | STOP | | | |
| 1995 | BREAK | | | |
| COPYRIGHT | STOP | | | |
| NEWSBYTES | NEWSBYTES | NEWSBYTES | | |
| INC. | INC. | NEWSBYTES INC. | | |
| | BREAK | FLUSH | NEWSBYTES INC. | BUSINESS MARKERS |
| 1995 | BREAK | | | |
| ************ | BREAK | | | |
| ************ | | | | |
| NEWSBYTES | NEWSBYTES | NEWSBYTES | | |
| NEWSBYTES | NEWSBYTES | NEWSBYTES NEWSBYTES | | |
| AUGUST | STOP | FLUSH | REJECT | |
| 31 | BREAK | | | |
| | BREAK | | | |
| 1995 | BREAK | | | |
| pNEWS831.0001 | pNEWS831.0001 | pNEWS831.0001 | | WORDS CONTAINING NUMBERS |
| ------------ | BREAK | FLUSH | | |
| ............ | | | | |
| NEC | NEC | NEC | | |
| DEVELOPS | ACTIVE VERB | FLUSH | | |
| SNAKE-LIKE | SNAKE-LIKE | SNAKE-LIKE | | |
| ROBOT | ROBOT | SNAKE-LIKE ROBOT | | |
| | BREAK | FLUSH | SNAKE-LIKE ROBOT | |
| AUTHOR | AUTHOR | AUTHOR | | |
| CR | BREAK | FLUSH | | |
| MARK | MARK | MARK | | |
| | BREAK | FLUSH | | |
| JEREMY | JEREMY | JEREMY | | |
| CR | BREAK | FLUSH | | |
| FULL | FULL | FULL | | |
| TEXT | TEXT | FULL TEXT | | |
| CR | BREAK | FLUSH | FULL TEXT | |
| TOKYO | TOKYO | TOKYO | | |

FIGURE 5A

| WORD READ | WORD TYPE | BUFFER | WORD INDEX | COMMENTS |
|---|---|---|---|---|
| | BREAK | FLUSH | | |
| JAPAN | JAPAN | JAPAN | | |
| , | BREAK | FLUSH | | |
| 1995 | BREAK | | | |
| AUG | STOP | | | |
| 31 | BREAK | | | |
| ( | BREAK | | | |
| NB | STOP | | | |
| ) | BREAK | | | |
| -- | BREAK | | | |
| NEC | NEC | NEC | | |
| CORPORATION | CORPORATION | NEC CORPORATION | | |
| HAS | STOP | FLUSH | NEC CORPORATION | |
| DEVELOPED | DEVELOPED | DEVELOPED | | |
| A | STOP | FLUSH | | |
| ROBOTICALLY | ROBOTICALLY | ROBOTICALLY | | |
| CONTROLLED | CONTROLLED | ROBOTICALLY CONTROLLED | | |
| ELECTRONIC | ELECTRONIC | ROBOTICALLY CONTROLLED ELECTRONIC | | |
| SNAKE | SNAKE | ROBOTICALLY CONTROLLED ELECTRONIC SNAKE | ROBOTICALLY CONTROLLED ELECTRONIC SNAKE | |
| THAT | STOP | FLUSH | | |
| OFFERS | ACTIVE VERB | | | |
| FAR | STOP | | | |
| MORE | STOP | | | |
| MOVEMENT | MOVEMENT | MOVEMENT | | |
| THAT | STOP | FLUSH | | |
| PREVIOUSLY | PREVIOUSLY | PREVIOUSLY | | |
| DESIGNED | DESIGNED | PREVIOUSLY DESIGNED | | |
| ROBOTS | ROBOTS | PREVIOUSLY DESIGNED ROBOTS | | |
| . | BREAK | FLUSH | PREVIOUSLY DESIGNED ROBOTS | |
| THE | STOP | | | |
| COMPANY | COMPANY | COMPANY | | |
| SAYS | STOP | FLUSH | | |
| THAT | STOP | | | |
| THE | STOP | | | |

FIGURE 5B

| WORD READ | WORD TYPE | BUFFER | WORD INDEX | COMMENTS |
|---|---|---|---|---|
| MUCH | STOP | | | |
| GREATER | STOP | | | |
| FREEDOM | FREEDOM | FREEDOM | | |
| OF | CONNECTOR | FREEDOM OF | | |
| MOVEMENT | MOVEMENT | FREEDOM OF MOVEMENT | | |
| MAKES | STOP | FLUSH | FREEDOM OF MOVEMENT | |
| IT | STOP | | | |
| PERFECT | PERFECT | PERFECT | | |
| FOR | STOP | FLUSH | | |
| EVERYTHING | STOP | | | |
| FROM | STOP | | | |
| INDUSTRIAL | INDUSTRIAL | INDUSTRIAL | | |
| TO | STOP | FLUSH | | |
| DISASTER | DISASTER | DISASTER | | |
| RELIEF | RELIEF | DISASTER RELIEF | | |
| WORK | WORK | DISASTER RELIEF WORK | | |
| | BREAK | FLUSH | DISASTER RELIEF WORK | |
| THE | STOP | | | |
| SECRET | SECRET | SECRET | | |
| OF | CONNECTOR | SECRET OF | | |
| THE | THE | SECRET OF THE | | |
| NEW | NEW | SECRET OF THE NEW | | |
| DEVICE | DEVICE | SECRET OF THE NEW DEVICE | | |
| LIES | ACTIVE VERB | FLUSH | SECRET OF THE NEW DEVICE | |
| IN | STOP | | | |
| A | STOP | | | |
| REVOLUTIONARY | REVOLUTIONARY | REVOLUTIONARY | | |
| NEW | NEW | REVOLUTIONARY NEW | | |
| TYPE | TYPE | REVOLUTIONARY NEW TYPE | | |
| OF | CONNECTOR | REVOLUTIONARY NEW TYPE OF | | |
| UNIVERSAL | UNIVERSAL | REVOLUTIONARY NEW TYPE OF UNIVERSAL | | |
| JOINT | JOINT | REVOLUTIONARY NEW TYPE OF UNIVERSAL JOINT | | |

FIGURE 5C

| WORD READ | WORD TYPE | BUFFER | WORD INDEX | COMMENTS |
|---|---|---|---|---|
| | BREAK | FLUSH | REVOLUTIONARY NEW TYPE OF UNIVERSAL JOINT | |
| PREVIOUSLY | PREVIOUSLY | PREVIOUSLY | | |
| JOINTS | ACTIVE VERB | FLUSH | | |
| IN | STOP | | | |
| THE | STOP | | | |
| BODY | BODY | BODY | | |
| OF | CONNECTOR | OF | | |
| ROBOT | ROBOT | BODY OF ROBOT | | |
| HAVE | STOP | FLUSH | BODY OF ROBOT | |
| BEEN | STOP | | | |
| RESTRICTED | RESTRICTED | RESTRICTED | | |
| TO | STOP | FLUSH | | |
| MOVEMENT | MOVEMENT | MOVEMENT | | |
| IN | STOP | FLUSH | | |
| JUST | STOP | | | |
| ONE | STOP | | | |
| PLANE | PLANE | PLANE | | |
| | BREAK | FLUSH | | |
| EITHER | STOP | | | |
| LEFT | LEFT | LEFT | | |
| AND | CONNECTOR | LEFT AND | | |
| RIGHT | RIGHT | LEFT AND RIGHT | | |
| OR | STOP | FLUSH | LEFT AND RIGHT | |
| UP | STOP | | | |
| AND | CONNECTOR | | | |
| DOWN | STOP | | | |
| | BREAK | | | |
| BUT | STOP | | | |
| THE | STOP | | | |
| TOKYO-BASED | TOKYO-BASED | TOKYO-BASED | | |
| COMPANY | COMPANY | FLUSH COMPANY | | |
| SAYS | STOP | FLUSH | | |
| IT | STOP | | | |
| HAS | STOP | | | |
| SUCCEEDED | SUCCEEDED | SUCCEEDED | | |
| IN | STOP | FLUSH | | |
| DEVELOPING | DEVELOPING | DEVELOPING | | |
| THE | STOP | FLUSH | | |
| WORLD'S | WORLD'S | WORLD'S | | |
| FIRST | FIRST | WORLD'S FIRST | | |

FIGURE 5D

| WORD READ | WORD TYPE | BUFFER | WORD INDEX | COMMENTS |
|---|---|---|---|---|
| ACTIVE | ACTIVE | WORLD'S FIRST ACTIVE | | |
| UNIVERSAL | UNIVERSAL | WORLD'S FIRST ACTIVE UNIVERSAL | | |
| JOINT | JOINT | WORLD'S FIRST ACTIVE UNIVERSAL JOINT | | |
| | BREAK | FLUSH | WORLD'S FIRST ACTIVE UNIVERSAL JOINT | |
| CONTROLLED | CONTROLLED | CONTROLLED | | |
| BY | STOP | FLUSH | | |
| TWO | STOP | | | |
| MOTORS | MOTORS | MOTORS | | |
| | BREAK | FLUSH | | |
| THE | STOP | | | |
| JOINT | JOINT | JOINT | | |
| ALLOWS | ACTIVE VERB | FLUSH | | |
| FULL | FULL | FULL | | |
| FREEDOM | FREEDOM | FULL FREEDOM | | |
| OF | CONNECTOR | FULL FREEDOM OF | | |
| MOVEMENT | MOVEMENT | FULL FREEDOM OF MOVEMENT | | |
| IN | STOP | FLUSH | FULL FREEDOM OF MOVEMENT | |
| ALL | STOP | | | |
| PLANES | ACTIVE VERB | | | |
| AT | STOP | | | |
| EACH | STOP | | | |
| OF | CONNECTOR | | | |
| THE | THE | | | |
| SIX | STOP | | | |
| JOINTS | ACTIVE VERB | | | |
| ALONG | STOP | | | |
| THE | STOP | | | |
| ROBOT'S | ROBOT'S | ROBOT'S | | |
| BODY | BODY | ROBOT'S BODY | | |
| | BREAK | FLUSH | ROBOT'S BODY | |
| ALLOWING | ALLOWING | ALLOWING | | |
| THE | STOP | FLUSH | | |
| UNIT | UNIT | UNIT | | |
| TO | STOP | FLUSH | | |
| CRAWL | CRAWL | CRAWL | | |

FIGURE 5E

| WORD READ | WORD TYPE | BUFFER | WORD INDEX | COMMENTS |
|---|---|---|---|---|
| INTO | STOP | FLUSH | | |
| PLACES | ACTIVE VERB | | | |
| PREVIOUSLY | PREVIOUSLY | PREVIOUSLY | | |
| INACCESSIBLE | INACCESSIBLE | PREVIOUSLY INACCESSIBLE | | |
| . | BREAK | FLUSH | PREVIOUSLY INACCESSIBLE | |
| AT | STOP | | | |
| THE | STOP | | | |
| HEART | HEART | HEART | | |
| OF | CONNECTOR | HEART OF | | |
| THE | THE | HEART OF THE | | |
| ROBOT | ROBOT | HEART OF THE ROBOT | | |
| IS | STOP | FLUSH | HEART OF THE ROBOT | |
| A | STOP | | | |
| COMPUTER | COMPUTER | COMPUTER | | |
| PROCESSING | PROCESSING | COMPUTER PROCESSING | | |
| UNIT | UNIT | COMPUTER PROCESSING UNIT | | |
| THAT | STOP | FLUSH | COMPUTER PROCESSING UNIT | |
| RECEIVES | ACTIVE VERB | | | |
| SIGNALS | SIGNALS | SIGNALS | | |
| FROM | STOP | FLUSH | | |
| THE | STOP | | | |
| OPERATOR'S | OPERATOR'S | OPERATOR'S | | |
| HANDSET | HANDSET | OPERATOR'S HANDSET | | |
| AND | CONNECTOR | OPERATOR'S HANDSET AND | | |
| CONTROLS | ACTIVE VERB | FLUSH | OPERATOR'S HANDSET | |
| MOVEMENT | MOVEMENT | MOVEMENT | | |
| . | BREAK | FLUSH | | |
| THE | STOP | | | |
| CONTROLLER | CONTROLLER | CONTROLLER | | |
| CAN | STOP | FLUSH | | |
| INSTRUCT | INSTRUCT | INSTRUCT | | |
| THE | STOP | FLUSH | | |
| COMPUTER | COMPUTER | COMPUTER | | |
| TO | STOP | FLUSH | | |
| CONTROL | CONTROL | CONTROL | | |

FIGURE 5F

| WORD READ | WORD TYPE | BUFFER | WORD INDEX | COMMENTS |
|---|---|---|---|---|
| ALL | STOP | FLUSH | | |
| THE | STOP | | | |
| JOINTS | ACTIVE VERB | | | |
| IN | STOP | | | |
| HARMONY | HARMONY | HARMONY | | |
| OR | STOP | FLUSH | | |
| SPECIFY | SPECIFY | SPECIFY | | |
| INDIVIDUAL | INDIVIDUAL | INDIVIDUAL | | |
| CONTROL | CONTROL | INDIVIDUAL CONTROL | | |
| OF | CONNECTOR | INDIVIDUAL CONTROL OF | | |
| EACH | STOP | FLUSH | INDIVIDUAL CONTROL | |
| JOINT | JOINT | JOINT | | |
| IF | STOP | FLUSH | | |
| NECESSARY | NECESSARY | NECESSARY | | |
| . | BREAK | FLUSH | | |
| A | STOP | | | |
| VIDEO | VIDEO | VIDEO | | |
| CAMERA | CAMERA | VIDEO CAMERA | | |
| AT | STOP | FLUSH | VIDEO CAMERA | |
| THE | STOP | | | |
| HEAD | HEAD | HEAD | | |
| OF | CONNECTOR | HEAD OF | | |
| THE | THE | HEAD OF THE | | |
| ROBOT | ROBOT | HEAD OF THE ROBOT | | |
| SENDS | ACTIVE VERB | FLUSH | HEAD OF THE ROBOT | |
| SIGNALS | SIGNALS | SIGNALS | | |
| BACK | STOP | FLUSH | | |
| TO | STOP | | | |
| THE | STOP | | | |
| OPERATOR | OPERATOR | OPERATOR | | |
| WHO | STOP | FLUSH | | |
| CAN | STOP | | | |
| USE | STOP | | | |
| THEM | STOP | | | |
| TO | STOP | | | |
| STEER | STEER | STEER | | |
| THE | STOP | FLUSH | | |
| UNIT | UNIT | UNIT | | |
| AND | CONNECTOR | UNIT AND | | |
| ALSO | STOP | FLUSH | | |
| TO | STOP | CONTROL | | |

FIGURE 5G

| WORD READ | WORD TYPE | BUFFER | WORD INDEX | COMMENTS |
|---|---|---|---|---|
| EXAMINE | EXAMINE | EXAMINE | | |
| PLACES | ACTIVE VERB | FLUSH | | |
| INACCESSIBLE | INACCESSIBLE | INACCESSIBLE | | |
| TO | STOP | FLUSH | | |
| HUMANS | HUMANS | HUMANS | | |
| | BREAK | FLUSH | | |
| THE | STOP | | | |
| ENTIRE | ENTIRE | ENTIRE | | |
| DEVICE | DEVICE | ENTIRE DEVICE | | |
| IS | STOP | FLUSH | ENTIRE DEVICE | |
| | BREAK | | | |
| | BREAK | | | |
| 4 | STOP | | | |
| METERS | ACTIVE VERB | | | |
| LONG | LONG | LONG | | |
| AND | CONNECTOR | LONG AND | | |
| MEASURES | ACTIVE VERB | FLUSH | | |
| 42 | BREAK | | | |
| MILLIMETERS | MILLIMETERS | MILLIMETERS | | |
| IN | STOP | FLUSH | | |
| DIAMETER | DIAMETER | DIAMETER | | |
| | BREAK | FLUSH | | |
| IT | STOP | | | |
| WEIGHS | WEIGHS | WEIGHS | | |
| 4 | BREAK | FLUSH | | |
| | BREAK | | | |
| 6 | BREAK | | | |
| KILOGRAMS | KILOGRAMS | KILOGRAMS | | |
| | BREAK | FLUSH | | |
| THE | STOP | | | |
| AS-YET | AS-YET | AS-YET | | |
| UNNAMED | UNNAMED | AS-YET UNNAMED | | |
| DEVICE | DEVICE | AS-YET UNNAMED DEVICE | | |
| IS | STOP | FLUSH | AS-YET UNNAMED DEVICE | |
| NOT | STOP | | | |
| YET | STOP | | | |
| COMMERCIALLY | COMMERCIALLY | COMMERCIALLY | | |
| AVAILABLE | AVAILABLE | COMMERCIALLY AVAILABLE | | |
| | BREAK | FLUSH | COMMERCIALLY AVAILABLE | |

FIGURE 5H

| WORD READ | WORD TYPE | BUFFER | WORD INDEX | COMMENTS |
|---|---|---|---|---|
| NEC'S | NEC'S | NEC'S | | |
| MARK | MARK | NEC'S MARK | | |
| PEARCE | PEARCE | NEC'S MARK PEARCE | NEC'S MARK PEARCE | |
| TOLD | ACTIVE VERB (PAST TENSE) | FLUSH TOLD | | |
| NEWSBYTES | NEWSBYTES | FLUSH NEWSBYTES | | |
| | BREAK | FLUSH | | |
| IT | STOP | | | |
| WILL | STOP | | | |
| BE | STOP | | | |
| A | STOP | | | |
| COUPLE | COUPLE | COUPLE | | |
| OF | CONNECTOR | COUPLE OF | | |
| YEARS | YEARS | COUPLE OF YEARS | | |
| BEFORE | STOP | FLUSH | COUPLE OF YEARS | |
| EVERYTHING | STOP | | | |
| IS | STOP | | | |
| SORTED | SORTED | SORTED | | |
| OUT | STOP | FLUSH | | |
| AND | CONNECTOR | | | |
| IT'S | STOP | | | |
| READY | READY | READY | | |
| TO | STOP | FLUSH | | |
| BE | STOP | | | |
| SOLD | SOLD | SOLD | | |
| | BREAK | FLUSH | | |
| WE | STOP | | | |
| HAVE | STOP | | | |
| TO | STOP | | | |
| INCREASE | INCREASE | INCREASE | | |
| THE | STOP | FLUSH | | |
| SPEED | SPEED | SPEED | | |
| AMONGST | STOP | FLUSH | | |
| OTHER | STOP | | | |
| THINGS | THINGS | THINGS | | |
| | BREAK | FLUSH | | |
| HE | STOP | | | |
| SAID | STOP | | | |
| | BREAK | | | |
| NEC | NEC | NEC | | |
| SAYS | STOP | FLUSH | | |
| TYPICAL | TYPICAL | TYPICAL | | |

FIGURE 51

| WORD READ | WORD TYPE | BUFFER | WORD INDEX | COMMENTS |
|---|---|---|---|---|
| APPLICATIONS | APPLICATIONS | TYPICAL APPLICATIONS | | |
| FOR | STOP | FLUSH | TYPICAL APPLICATIONS | |
| SUCH | STOP | | | |
| A | STOP | | | |
| ROBOT | ROBOT | ROBOT | | |
| COULD | STOP | FLUSH | | |
| BE | STOP | | | |
| INVESTIGATION | INVESTIGATION | INVESTIGATION | | |
| OF | CONNECTOR | INVESTIGATION OF | | |
| COMPLEX | COMPLEX | INVESTIGATION OF COMPLEX | | |
| PIPEWORK | PIPEWORK | INVESTIGATION OF COMPLEX PIPEWORK | | |
| OR | STOP | FLUSH | INVESTIGATION OF COMPLEX PIPEWORK | |
| AS | STOP | | | |
| AN | STOP | | | |
| AID | AID | AID | | |
| TO | STOP | FLUSH | | |
| SEARCH | SEARCH | SEARCH | | |
| TEAMS | ACTIVE VERB | FLUSH | | |
| IN | STOP | | | |
| DISASTER | DISASTER | DISASTER | | |
| HIT | HIT | DISASTER HIT | | |
| AREAS | AREAS | DISASTER HIT AREAS | | |
| WHERE | STOP | FLUSH | DISASTER HIT AREAS | |
| THE | STOP | | | |
| DEVICE | DEVICE | DEVICE | | |
| COULD | STOP | FLUSH | | |
| CRAWL | CRAWL | CRAWL | | |
| THROUGH | STOP | FLUSH | | |
| THE | STOP | | | |
| RUBBLE | RUBBLE | RUBBLE | | |
| OF | CONNECTOR | RUBBLE OF | | |
| COLLAPSED | COLLAPSED | RUBBLE OF COLLAPSED | | |

FIGURE 5J

| WORD READ | WORD TYPE | BUFFER | WORD INDEX | COMMENTS |
|---|---|---|---|---|
| BUILDINGS | BUILDINGS | RUBBLE OF COLLAPSED BUILDINGS | | |
| | BREAK | FLUSH | RUBBLE OF COLLAPSED BUILDINGS | |
| | BREAK | | | |
| MARTYN | MARTYN | MARTYN | | |
| WILLIAMS/19950 830/PRESS | WILLIAMS/19950 830/PRESS | MARTYN WILLIAMS/199508 30/PRESS | MARTYN WILLIAMS/199508 30/PRESS | WORDS CONTAINING NUMBERS |
| CONTACT | CONTACT | FLUSH CONTACT | | |
| | BREAK | FLUSH | | |
| MARK | MARK | MARK | | |
| PEARCE | PEARCE | MARK PEARCE | | |
| | BREAK | FLUSH | MARK PEARCE | |
| NEC | NEC | NEC | | |
| CORPORATION | CORPORATION | NEC CORPORATION | | |
| | BREAK | FLUSH | NEC CORPORATION | |
| TEL | STOP | | | |
| +81-3-3798-6511 | BREAK | | | |
| | BREAK | | | |
| FAX | STOP | | | |
| +81-3-3457-7289 | BREAK | | | |
| | BREAK | | | |
| INTERNET | INTERNET | INTERNET | | |
| E-MAIL | STOP | FLUSH | | |
| MAKU_10-22150@ALADDIN | MAKU_10-22150@ALADDIN | MAKU_10-22150@ALADDIN | | WORDS CONTAINING NUMBERS WORDS CONTAINING INTERNET CODES |
| | BREAK | FLUSH | | |
| NEC | NEC | NEC | | |
| | BREAK | FLUSH | | |
| CO | CO | CO | | |
| | BREAK | FLUSH | | |
| JP/NEC950831/PHOTO | JP/NEC950831/PHOTO | JP/NEC950831/PHOTO | | WORDS CONTAINING NUMBERS |
| ) | BREAK | FLUSH | | |
| | BREAK | | | |

FIGURE 5K

| WORD READ | WORD TYPE | BUFFER | WORD INDEX | COMMENTS |
|---|---|---|---|---|
| RECORD | RECORD | RECORD | | |
| # | BREAK | FLUSH | | |
| 17 | BREAK | | | |
| 337 | BREAK | | | |
| 363 | BREAK | | | |

FIGURE 5L

SYSTEM AND METHOD FOR PARSING A DOCUMENT

CLAIM OF PRIORITY

This application claims priority under 35 USC §120 to, and is a continuation-in-part of, U.S. patent application Ser. No. 09/288,994, filed on Apr. 9, 1999, now U.S. Pat. No. 6,424,982 the entire contents of which are hereby incorporated by reference.

BACKGROUND OF THE INVENTION

This invention relates generally to a system and method for processing a document and in particular to a system and method for identifying a plurality of phrases within the document which indicate the context of the document.

Various factors have contributed to the extensive storage and retrieval of textual data information using computer databases. A dramatic increase in the storage capacity of hard drives coupled with a decrease in the cost of computer hard drives, and increases in the transmission speed of computer communications have been factors. In addition, the increased processing speed of computers and the expansion of computer communications networks, such as a bulletin board or the Internet, have been factors. People therefore have access to the large amounts of textual data stored in these databases. However, although the technology facilitates the storage of and the access to the large amounts of textual data, there are new problems that have been created by the large amount of textual data that is now available.

In particular, a person trying to access textual data in a computer database having a large amount of data needs a system for analyzing the data in order to retrieve the desired information quickly and efficiently without retrieving extraneous information. In addition, the user of the system needs an efficient system for condensing each large document into a plurality of phrases (one or more words) which characterize the document so that the user of the system can understand the document without actually viewing the entire document. A system for condensing each document into a plurality of key phrases is known as a parsing system or a parser.

In one typical parser, the parser attempts to identify phrases which are repeated often within the document and identifies those phrases as being key phrases which characterize the document. The problem with such a system is that it is very slow since it must count the repetitions of each phrase in the document. It also requires a large amount of memory. As the amount of data to be parsed increases, the slow speed of this parser becomes unacceptable. Another typical parser performs a three step process to identify the key phrases. First, each word in the document is assigned a tag based on the part of speech of the word (i.e., noun, adjective, adverb, verb, etc.) and certain parts of speech, such as an article or an adjective, may be removed from the list of phrases which characterizes the document. Next, one or more sequences of words (templates) may be used to identify and remove phrases which do not add any understanding to the document. Finally, any phrase which is an appropriate part of speech and does not fall within one of the templates is accepted as a key phrase which characterizes the document. This conventional parser, however, is also slow which is unacceptable as the amount of data to be parsed increases.

In all of these conventional parser systems, the parser attempts to break the document down into smaller pieces based on the characteristics (frequency of repetition or part of speech) of the particular words in the document. The problem is that language generally is not that easily classified and therefore the conventional parser does not accurately parse the document or requires a large amount of time to parse the document. In addition, the conventional parser systems are very slow because they all attempt to use complex characteristics of the language as a method for parsing the key phrases out of the document. These problems with conventional parsers becomes more severe as the number of documents which must be parsed increases. Today, the number of documents which must be parsed is steadily increasing at a tremendous rate due to, among other things, the Internet and the World Wide Web. Therefore, these conventional parsers are not acceptable. Thus, it is desirable to provide a parsing system and method which solves the above problems and limitations with conventional parsing systems and it is to this end that the present invention is directed.

SUMMARY OF THE INVENTION

A parser system and method in accordance with the invention is provided in which the break characters within a sentence or a paragraph are used to parse the document into a plurality of key phrases. The parser system in accordance with the invention is very fast and does not sacrifice much accuracy for the speed. The break characters within the document may include punctuation marks, certain stop words and certain types of words such as verbs and articles. The parser system may include a buffer which receives one or more words before it receives a break character. When the buffer receives a break character, the parser may determine whether the phrase before the break character is saved based on the type of break character. In particular, if the break character is a punctuation mark, the parser may keep the one or more words before the break character as a key phrase. If the break character is another type of character, the phrase before the break character may or may not be saved. Once the fate of the phrase has been determined, the buffer is flushed and the next sequence of one or more words is read into the buffer so that it may also be parsed. In this manner, a plurality of phrases in the document may be rapidly extracted from the document based on the break characters within the sentences and paragraphs of the document.

The parser system in accordance with the invention may also be used to parse various different foreign languages into phrases provided that the rules database includes rules that are applicable to the particular foreign language. In particular, each foreign language may have slightly. different syntax or characters (in the case of Asian languages or Arabic, for example) so that the rules must reflect those syntactic and character differences.

Thus, in accordance with the invention, a system for parsing a piece of text into one or more phrases which characterize the document is provided. The system comprises a buffer for reading one or more words from the piece of text into the buffer and a parser for identifying a phrase contained in the buffer, the phrase being a sequence of two or more words in between break characters. The parser further comprises means for determining the type of break character that follows the identified phrase and means for saving a key phrase from the buffer based on the determined type of break character. The key phrases are stored in a database.

In accordance with another aspect of the invention, the parsing method may include a two-pass process wherein phrases are extracted from the piece of text as described above. During the second pass, all of the occurrences of the extracted phrases in the piece of text are retrieved. The second pass ensures that phrases that were not extracted at each location in the piece of text may still be retrieved.

BRIEF DESCRIPTION OF THE DRAWINGS

FIG. 4 is an example of a document to be parsed by the parsing system in accordance with the invention;

FIGS. 5A-5L are diagrams illustrating the operation of the parsing buffer in accordance with the invention on the document shown in FIG. 4;

DETAILED DESCRIPTION OF A PREFERRED EMBODIMENT

The invention is particularly applicable to a system for parsing English language documents and it is in this context that the invention will be described. It will be appreciated, however, that the system and method in accordance with the invention has greater utility, such as to other languages and to various different pieces of textual data. To better understand the invention, a text processing system will now be described.

Figure 1:
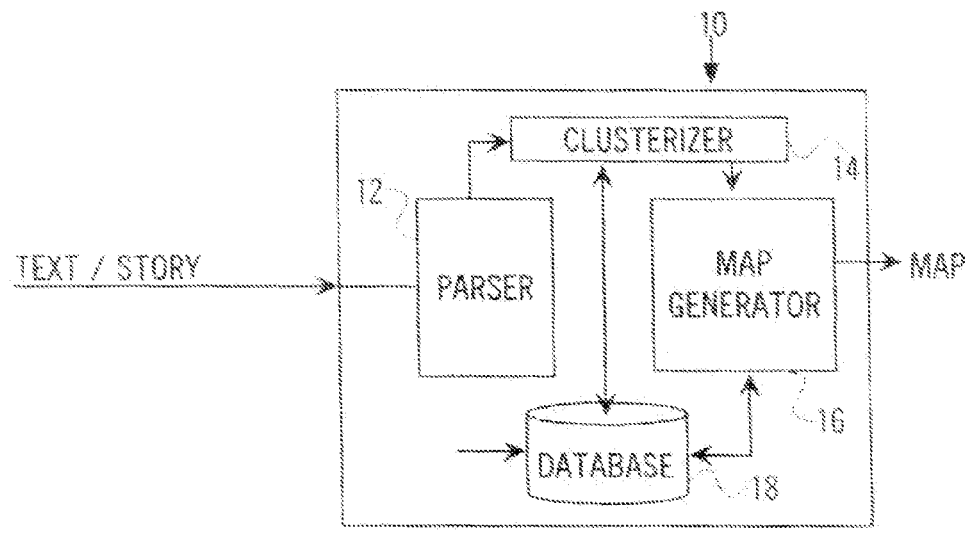
FIG. 1 is a block diagram of a text processing system.

FIG. 1 is a block diagram of a text processing system 10. The text processing system 10 may include a parser system 12, a clusterizer 14, a map generator 16 and a database (DB) 18. The text processing system may receive one or more pieces of text, such as stories, press releases or documents, and may generate a map graphically showing the relationships between the key phrases in the document. Each piece of text may be received by the parser system 12 which processes each piece of incoming text and generates one or more key phrases for each piece of text which characterizes the piece of text. The key phrases may be stored in the database 18. The details about the parser system will be described below with reference to FIGS. 2-5. Once the key phrases are extracted from each piece of text, the clusterizer 14 may generate one or more clusters of the key phrases based on the relationships between the phrases. The clusters generated may also be stored in the database 18. The map generator 16 may use the generated clusters for the pieces of text in the database in order to generate a graphical map showing the relationships of the key phrases within the various pieces of text in the database to each other so that a user of the system may easily search through the database by viewing the key phrases of the pieces of text. More details about the clusterizer and map generator are disclosed in co-pending U.S. patent application Ser. No. 08/801,970 which is owned by the assignee of the present invention and is incorporated herein by reference. The text processing system may be implemented in a variety of manners including a client/server type computer system in which the client computers access the server via a public computer network, such as the Internet. The parser, the clusterizer and the map generator may be software applications being executed by a central processing unit (not shown) of the text processing system 10. Now, the parser system 12 in accordance with the invention will be described in more detail.

Figure 2:
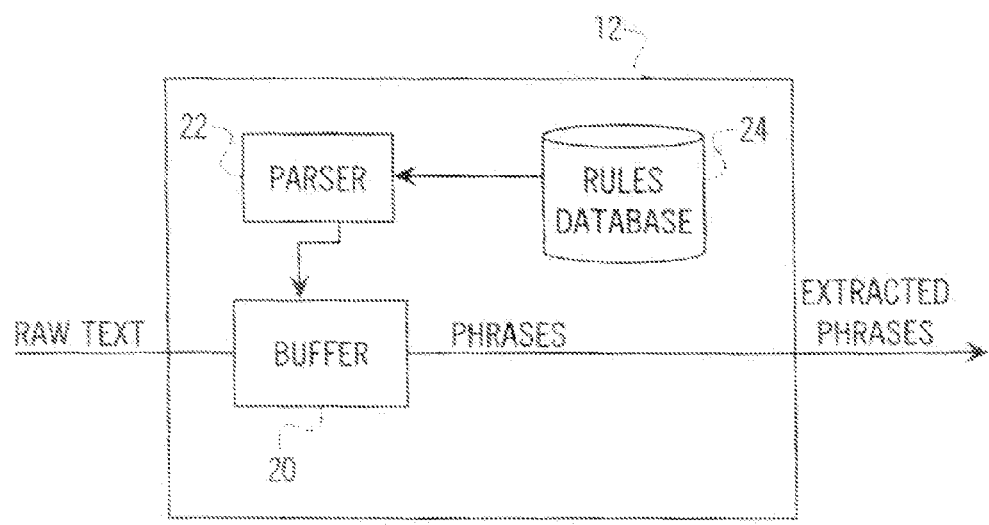
FIG. 2 is a block diagram of a parsing system in accordance with the invention.

FIG. 2 is a block diagram of the parsing system 12 in accordance with the invention. The parsing system 12 may include a buffer 20, a parser 22 and a rules database (rules DB) 24. The buffer may store one or more words of the incoming piece of text, which may be a document, which are analyzed by the parser 22 using the rules contained in the rules DB 24. The output of the parser system 12 is one or more phrases (each phrase containing one or more words) which characterize the document being parsed. In particular, the parser may separate phrases in the document based on break characters within the document in accordance with the invention. In more detail, one or more words may be read into the buffer from the document until a break character is identified. Thus, the parser system 12 identifies phrases which are between break characters. Then, based on the type of break character, the phrase may be saved as a key phrase or deleted. The parser system 12, for example, may be implemented as one or more pieces of software being executed by a microprocessor (not shown) of a server computer which may be accessed by a plurality of client computers over a computer network, such as the Internet, a local area network or a wide area network. The parser 22 advantageously rapidly extracts key phrases from a piece of text using break characters. The break characters in accordance with the invention will now be described.

The break characters may include an explicit break, such as a punctuation mark, numbers, words containing numbers, and stop words. The stop words may be further classified as soft stop words or a hard stop words. Each of these different break characters will now be described. The explicit break characters may include various punctuation symbols, such as a period, a comma, a semicolon, a colon, an exclamation point, right or left parenthesis, left or right square brackets, left or right curly braces, a return character or a line feed character. The stop characters may be a generated list or it may include a slash (/) and an ampersand symbol (@). A separator may be defined as digits, letters, foreign characters, break characters, apostrophes, dashes and other stop characters. The various words in a piece of text may be categorized as articles, connectors, hard and soft stop characters, linguistic indicators, a syntactic categories such as nouns, verbs, irregular verbs, adjectives and adverbs.

In parsing the characters in the piece of text, separators may always be added to a phrase. A apostrophe or dash at the beginning of a word is treated as a break character (see below), an apostrophe or dash at the end of a word is also treated as a break character and a word with an apostrophe or dash in the middle of the word is added to the phrase in the buffer. All stop characters and breaks are treated as stop characters and breaks as described below. At the word level of parsing, proper nouns are retained by testing for an upper case letter at the first character of the word. In addition, all words with only upper case letters and numeric words are kept in the buffer. Optionally, a numeric string may be classified and treated as a stop character. The following are mandatory word level parsing rules. First, the word following as possessive "s" may be deleted. For example, as the sentence "The cat's paw is wet." is parsed in accordance with the invention, "the" is deleted and "cat" is put into the buffer and then deleted when the break character (the apostrophe) is detected. The apostrophe is deleted because it is punctuation then the next character to parse is the possessive "s" after the apostrophe which is deleted along with the word "paw" since it follows the possessive "s". Connector words appearing at the beginning of a phrase are also deleted although a connector word followed by "The" is kept in the buffer. For a hard stop character, the last phrase connected to the hard stop character is deleted and the remaining buffer is processed. A soft stop character may be treated as a break character. A repeated character is treated as a stop character.

To further remove unwanted words for parsing, some optional phrase level parsing rules may be used. In particular, phrases longer than a predetermined length, such as six words, may be deleted, a phrase with all upper case words may be deleted and a phrase with all numeric words may be deleted. All of the above parsing rules may be stored in the parsing rules database 24 shown in FIG. 2. Now, the details of the parser system 12 will now be described with reference to FIGS. 3A and 3B.

Figure 3A:
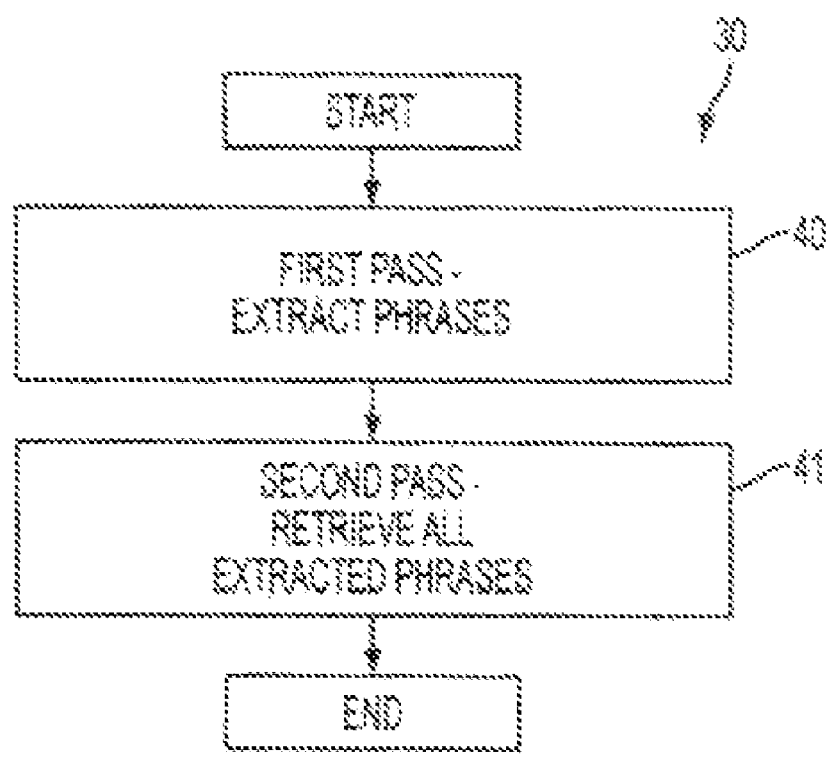
FIG. 3A is a flowchart illustrating a two-pass parsing method in accordance with the invention.

FIG. 3A is a flowchart illustrating a two pass parsing process 30 in accordance with the invention. In particular, during a first pass 40, one or more phrases are extracted from a piece of text using the hard and soft stop words as described below with reference to FIG. 3B. The first pass thus extracts noun phrases. For example, if a piece of text includes, "The big frog and the kangaroo jumps down.", the first pass extracts the phrase "big frog", but not "kangaroo jumps" as described below. During a second pass 41, all extracted phrases are retrieved from the piece of text. In particular, the occurrence of each extracted phrase in the piece of text may be retrieved from the piece of text. For example, assume that a piece of text contains the fragments, "The software bugs on . . . " and "software bugs are . . . ". The parser in the first step throws away the first occurrence of the term "software bugs" since it is followed by a hard stop, but retains the second occurrence since it is followed by a soft stop. To prevent the parser from discarding good noun phrases, such as the first occurrence of the term "software bugs", the second pass retrieves all occurrences of the extracted phrases from the piece of text so that, for example, both occurrences of the term "software bugs" are retrieved. Now, the first pass of the method will be described in more detail.

Figure 3B:
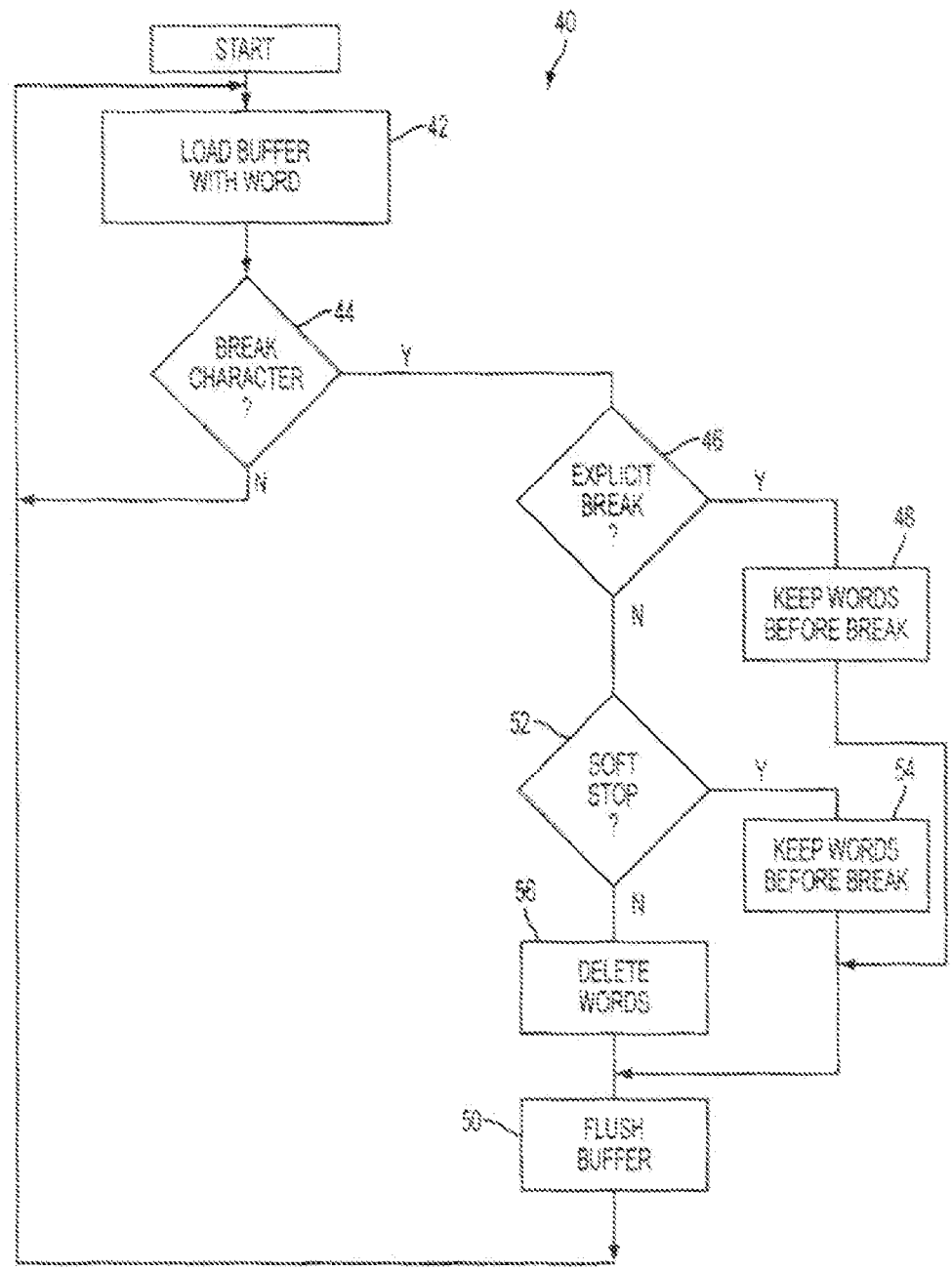
FIG. 3B is a flowchart illustrating more details of the extracting phrases step of the parsing method shown in FIG. 3A.

FIG. 3B is a flowchart illustrating more details of the phrase extracting step 40 for parsing a document in accordance with the invention. The method begins as a first word of the document is loaded into the buffer from a document database or a memory of the server in step 42. Next, the parser determines if the word is a break character in step 44. The parser may also delete certain characters or words at this stage of the parsing process. If the word is not a break character, the method loops back to step 42 and the next word of the document is read into the buffer. This process of reading a word into the buffer is repeated until a break character is encountered so that the buffer contains a sequence of words (a phrase) which has a break character before the sequence of words and a break character after the sequence of words. In this manner, the document is parsed into phrases which are separated from one another by break characters.

If a break character is encountered, the parser may determine if the break character is an explicit break character in step 46, delete the break character and extract the phrase contained in the buffer if an explicit break character exists in step 48. The phrase extracted from the buffer may be stored in a database for future use. Next, in step 50, the buffer may be flushed to empty the words from the buffer and the buffer may begin loading new words into the buffer in steps 42 and 44 until another break character is identified. Returning to step 46, if the break character is not an explicit break character, the parser determines if the break character is a soft stop word in step 52. If the break character is a soft stop word, then the soft stop word is deleted and the phrase in the buffer is stored in the database in step 54, the buffer is flushed in step 50 and the buffer is refilled with new words from the document. If the break character is not a soft stop word (i.e., the break character is a hard stop word), the hard stop word and the phrase in the buffer are deleted in step 56, the buffer is flushed in step 50 and refilled with new words from the document in steps 42 and 44. In this manner, phrases from the document are extracted in accordance with the invention using the break characters and the type of break character to separate the phrases from each other and determine which phrases are going to be saved in the database. The parser in accordance with the invention does not attempt to analyze each word of the document to identify key phrases as with conventional systems, but does extract phrases from the document more quickly than conventional parsers and with as much accuracy as the conventional parsers. Now, an example of the operation of the parser in accordance with the invention will be described with reference to FIGS. 4 and 5A-5L.

FIG. 4 is an example of a document 60 to be parsed by the parsing system in accordance with the invention while FIGS. 5A-5L illustrate the operation of the buffer during the parsing of the document 60 shown in FIG. 4. In this example, the document is a short electronic news story, but the parser may also extract phrases from any other piece of text. In fact, the parser in accordance with the invention may be able to extract phrases from various types of documents at speeds of up to 1 MByte of data per second. The particular story shown describes a new "snake-like" robot developed by NEC. FIGS. 5A-5L illustrate, in a table 68, the operation of the buffer in accordance with the invention on the above story. In particular, a first column 70 of the table contains the current word being read into the buffer, a second column 72 contains the determination of the type of word by the parser in accordance with the invention, a third column 74 contains the contents of the buffer at the particular time, a fourth column 76 contains the word index (i.e., the phrases which are being extracted from the document) and a fifth column 78 contains comments about the parsing process.

As shown in FIG. 5A, the first word read into the buffer is a sequence of asterisks at the beginning of the story which are classified by the parser as a break word (punctuation) and deleted from the buffer. The next word is "Computer" which is entered into the buffer since it is not a break word and the next word, which is "Select" is also entered into the buffer since it is also not a break word. Thus, the buffer contains the phrase "Computer Select" as shown in a cell 80. The next word in the document is a comma which is classified as a break character by the parser. Because the break character is punctuation (an explicit break), the words in the buffer are saved in the database as shown in the Word Index column 76 and the buffer is flushed. Now, new words are read into the buffer and parsed. The next word into the buffer is "October" which is a hard stop word because it relates to a date and it is deleted. The next word received by the buffer is "1995" which is a break character since it is a number and it is also deleted. The next word received by the buffer is "COPYRIGHT" which is identified as a stop word because it is all capital letters and it is deleted. The next word is "Newsbytes" which is not a break character and is therefore stored into the buffer. The next word is "Inc." which is also stored in the buffer. The next word is a period which is a break character so that the buffer contents "Newsbytes Inc." are saved into a database as shown in the Word Index column, the break character is deleted and the buffer is flushed.

The next two word received by the buffer, which are "1995" and a sequence of asterisks, are both break words which are deleted. The next two words received by the buffer are "Newsbytes" and "Newsbytes" which are both stored in the buffer. The next word received is "August" which is a hard stop word so that the contents of the buffer and the hard stop word is deleted. The next three words received by the buffer are all break characters (i.e., numbers or punctuation) which are deleted. The next word is a word containing a number in a cell 82 which is stored in the buffer, but then deleted when the next character is a break character because the buffer only contains a single word. As can be seen in FIGS. 5B-5L, the parsing process continues for the entire document so that a list of key phrases, as shown in the Word Index column 76, are extracted from the document and saved in a database.

In summary, phrases which characterize the document or piece of text may be rapidly extracted from the document in accordance with the invention. The invention uses the break characters in the document or the piece of text to separate the phrases from each other and to extract the key phrases for a document. In the example above, the extracted phrases, such as "Newsbytes Inc.", "snake-like robot", "NEC Corporation", "robotically controlled electronic snake", "disaster relief work" and "world's first active universal joint" permit a person reviewing only the key phrases to understand the context of the document without reviewing the entire document. The parsing system in accordance with the invention performs the extraction of the key phrases more rapidly than any other conventional parsing systems which is important as the total amount of textual data and documents available for parsing increases at an exponential rate due, in part, to the explosion of the user of the Internet.

The parser in accordance with the invention may be used to parse documents in various different foreign languages with minor modifications to the rules database to reflect changes in the characters and changes in the syntax of the language. To better understand this, an example of a piece of Japanese text is described along with the resulting Japanese taxonomy. However, the invention may be used with a variety of different foreign languages with minor modifications to the rules database.

Figure 6:
FIG. 6 is a diagram illustrating a piece of Japanese text.
Figure 7:
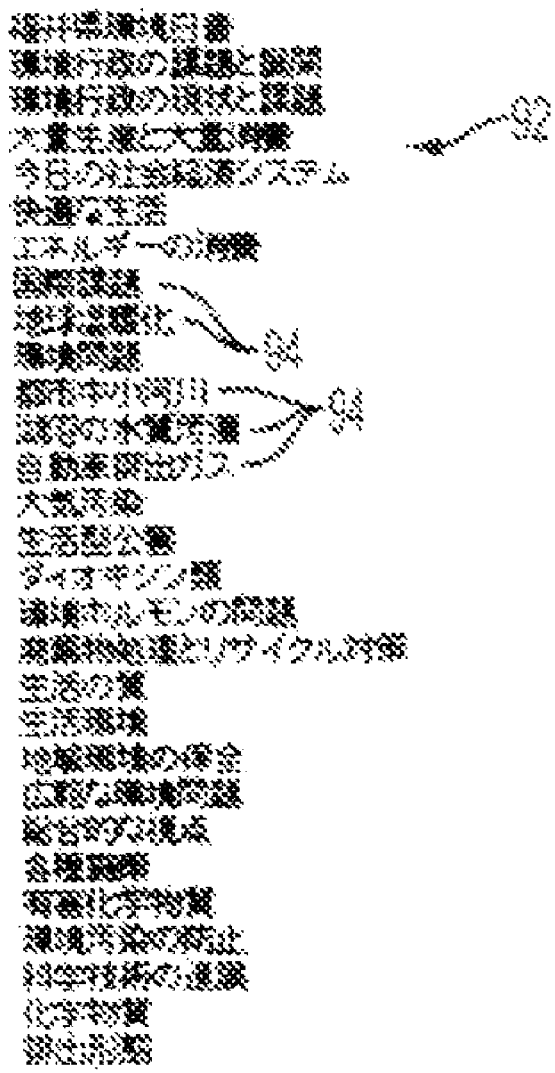
FIG. 7 is a diagram illustrating the Japanese phrases extracted from the Japanese text of FIG. 6 in accordance with the invention.

FIG. 6 is an example of a piece of Japanese text 90 while FIG. 7 illustrates a list 92 of phrases 94 that have been extracted from the piece of Japanese text using the two-pass parsing method in accordance with the invention.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system including a computer processor for parsing a piece of text into one or more phrases which characterize the piece of text, the system comprising:
a buffer, configured for storing one or more words from the piece of text until a break character is identified;
a parser that extracts at least one of the one or more words from the buffer when the break character is identified and which stores at least one of the at least one extracted words as a phrase in a memory based on a type of the break character identified, wherein the parser further extracts additional occurrences of the at least one extracted words from the piece of text after the buffer is parsed.

2. The system of claim 1, wherein the buffer further comprises a means for flushing the buffer when the at least one of the one or more words are extracted from the buffer.

3. The system of claim 1, wherein the parser only extracts noun phrases from the buffer.

4. A method for parsing a piece of text into one or more phrases which characterize the piece of text, the method comprising:
reading one or more words from the piece of text into a buffer until a break character is identified;
extracting at least one of the one or more words from the buffer when the break character is identified using a parser;
storing at least one of the at least one extracted words as a phrase in a memory based on a type of the break character identified; and
extracting, by the parser, additional occurrences of the at least one extracted words from the piece of text after the buffer is parsed.

5. The method of claim 4, further comprising flushing the buffer when the at least one of the one or more words are extracted from the buffer.

6. The method of claim 4, wherein the parser only extracts noun phrases from the buffer.

7. A system including a computer processor for parsing a piece of text into one or more phrases which characterize the piece of text, the system comprising:
a parser, comprising:
a first pass processing means for extracting at least one of one or more words from a buffer when a break character is identified; and
a means for storing at least one of the at least one extracted words as a phrase in a memory based on a type of the break character identified; and
a second pass processing means for retrieving additional occurrences of the at least one extracted words from the piece of text after the piece of text is parsed.

8. A method for parsing a piece of text into one or more phrases which characterize the piece of text, the method comprising:
performing a first pass through the piece of text by a parser, the first pass comprising:
extracting at least one of one or more words from a buffer when a break character is identified; and
storing at least one of the at least one extracted words as a phrase in a memory based on a type of the break character identified; and
performing a second pass through the piece of text by the parser, the second pass comprising retrieving additional occurrences of the at least one extracted words from the piece of text after the piece of text is parsed.

9. A method comprising:
receiving a first word from a text stream into a buffer;
receiving a first break character that follows the first word within the text stream into the buffer;
temporarily retaining the first word within the buffer, based on the first break character;
receiving a second word from the text stream into the buffer, the second word following the first break character in the text stream;
receiving a second break character into the buffer, the second break character following the second word in the text stream;
extracting the first word and the second word from the buffer by a parser and storing the first word and the second word as a phrase in a memory prior to receiving a third word from the text stream at the buffer; and
extracting additional occurrences of the first word and second word from the text stream after the text stream is parsed by the parser.

* * * * *